US012382967B2

(12) United States Patent
Hane et al.

(10) Patent No.: US 12,382,967 B2
(45) Date of Patent: Aug. 12, 2025

(54) MEAT SEPARATOR AND DEVICE FOR STRIPPING MEAT PART FROM BONE-IN MEAT

(71) Applicant: MAYEKAWA MFG. CO., LTD., Tokyo (JP)

(72) Inventors: Shinji Hane, Tokyo (JP); Tomotaka Kajiyama, Tokyo (JP); Kenichi Oka, Tokyo (JP); Yusuke Koyama, Tokyo (JP); Ryuji Kodama, Tokyo (JP)

(73) Assignee: MAYEKAWA MFG CO., LTD., Toyko (JP)

( * ) Notice: Subject to any disclaimer, the term of this patent is extended or adjusted under 35 U.S.C. 154(b) by 0 days.

(21) Appl. No.: 18/717,680

(22) PCT Filed: Oct. 20, 2022

(86) PCT No.: PCT/JP2022/039147
§ 371 (c)(1),
(2) Date: Jun. 7, 2024

(87) PCT Pub. No.: WO2023/105945
PCT Pub. Date: Jun. 15, 2023

(65) Prior Publication Data

US 2025/0017221 A1 Jan. 16, 2025

(30) Foreign Application Priority Data

Dec. 9, 2021 (JP) ................................ 2021-200254

(51) Int. Cl.
*A22C 21/00* (2006.01)
*A22C 17/00* (2006.01)

(52) U.S. Cl.
CPC ................................ *A22C 17/004* (2013.01)

(58) Field of Classification Search
CPC .............. A22C 17/004; A22C 21/0076; A22C 21/003; A22C 21/0007; A22C 21/0069
(Continued)

(56) References Cited

U.S. PATENT DOCUMENTS 4,993,113 A * 2/1991 Hazenbroek ....... A22C 21/0076 452/167
5,067,927 A 11/1991 Hazenbroek et al.
(Continued)

FOREIGN PATENT DOCUMENTS

EP 3120706 B1 5/2018
JP H05-184281 A 7/1993
(Continued)

OTHER PUBLICATIONS

Office Action cited in corresponding Taiwain Application No. 111140986, dated Oct. 5, 2023 (8 pages).
(Continued)

*Primary Examiner* — Richard T Price, Jr.
(74) *Attorney, Agent, or Firm* — Osha Bergman Watanabe & Burton LLP

(57) ABSTRACT

A meat separator separates meat part attached to bone part by coming into contact with outer peripheral surface of the bone part of bone-in meat that moves relatively with respect to the meat separator. The meat separator includes a plurality of clamp blocks. The clamp blocks each include scraping contact portion that comes into contact with the outer peripheral surface of the bone part, and the scraping contact portions cooperate with each other so as to clamp the outer peripheral surface of the bone part. At least one of the clamp blocks is configured so that at least a part of the scraping contact portion of the clamp block is displaceable in a plurality of directions along outer surface shape of the bone part, and the at least one of the clamp blocks includes biasing
(Continued)

function portion that elastically pushes back the displacement in direction moving away from bone part.

5 Claims, 8 Drawing Sheets

(58) Field of Classification Search
USPC .......................................................... 452/135
See application file for complete search history.

(56) References Cited

U.S. PATENT DOCUMENTS

| | | | | |
|---|---|---|---|---|
| 5,267,891 A | | 12/1993 | Cresson et al. | |
| 5,401,210 A | | 3/1995 | Manmoto et al. | |
| 5,961,383 A | * | 10/1999 | Janssen | A22C 21/0076 452/136 |
| 9,615,591 B1 | | 4/2017 | Stooker et al. | |
| 2009/0270021 A1 | | 10/2009 | Umino et al. | |

FOREIGN PATENT DOCUMENTS

| | | |
|---|---|---|
| JP | 2008-099574 A | 5/2008 |
| JP | 4190705 B2 | 12/2008 |
| TW | 223006 B | 5/1994 |

OTHER PUBLICATIONS

International Search Report in corresponding International Application No. PCT/JP2022/039147, dated Nov. 29, 2022 (4 pages).
Search Report Issued in Corresponding EP Application No. 22903879.9, dated Feb. 14, 2025 (5 Pages).

* cited by examiner

MEAT SEPARATOR AND DEVICE FOR STRIPPING MEAT PART FROM BONE-IN MEAT

TECHNICAL FIELD

The present invention relates to a meat separator and a device for stripping meat part from bone-in meat which strips a meat part off a bone part of the bone-in meat such as chicken leg meat.

Priority is claimed on Japanese Patent Application No. 2021-200254, filed Dec. 9, 2021, the content of which is incorporated herein by reference.

BACKGROUND ART

In recent years, a meat part separating apparatus that mechanically separates a meat part off a bone part of bone-in meat such as chicken leg meat has been developed.

This type of meat part separating apparatus separates the meat part off the bone part using a meat separator while raising a clamper that holds an end portion of the bone part in a state in which an incision is made at an appropriate location in the meat part of the bone-in meat in advance by an incision device. The meat separator has a scraping claw that is inserted into the incision of the meat part such that the scraping claw comes into contact with the outer peripheral surface of the bone part of the bone-in meat. The meat part separating apparatus can separate the meat part off the bone part by raising the bone part with the scraping claw of the meat separator being pressed against the outer peripheral surface of the bone part of the bone-in meat (for example, see Patent Document 1).

The meat separator described in Patent Document 1 includes a fixed clamp (a fixed separator) that is fixed to the factory equipment and a movable clamp (a movable separator) that approaches and moves away from the fixed clamp. Scraping claws are provided at mutually opposing tip end portions of the fixed clamp and the movable clamp. Each scraping claw has a bone part receiving portion formed in a concave shape capable of receiving the outer peripheral surface of the bone part of the bone-in meat. The side edge portion of the bone part receiving portion of the fixed clamp and the side edge portion of the bone part receiving portion of the movable clamp face each other and overlap each other when the movable clamp is displaced in a direction approaching the fixed clamp. As a result, the two bone part receiving portions surround the outer periphery of the bone part of the bone-in meat, and when the bone part is raised in this state, the meat part is scraped off the bone part.

Further, the movable clamp is biased in a direction approaching the fixed clamp by a biasing part such as a spring member or an air cylinder. Due to this configuration, the meat separator can track a change of the outer surface shape of the bone part and scrape the meat part even if there is a part where an outer diameter changes in the middle of the bone part in a longitudinal direction or a bulge such as a knee joint.

CITATION LIST

Patent Document

Patent Document 1

Japanese Patent No. 4190705

SUMMARY OF INVENTION

Technical Problem

However, in the meat separator described in Patent Document 1, when the bone part of the bone-in meat is clamped, a clamping load by the two bone part receiving portions acts on the bone part in only one direction (a movable direction of the movable clamp). For this reason, there is a concern that it may be difficult to press the bone part receiving portion accurately along the outer surface shape of the bone part of the bone-in meat, and thus depending on the shape of the bone part, a large portion of the meat part may remain on the bone part, or conversely, a portion of the bone part may be scraped together with the meat part and remain as residual bone in the meat part.

Aspects of the present invention provide a meat separator and a meat part separating apparatus for bone-in meat that can efficiently and stably separate a meat part off a bone part of the bone-in meat.

Solution to Problem

A meat separator and a meat part separating apparatus for bone-in meat according to the present invention employ the following configurations.

According to the present invention, there is provided a meat separator that separates a meat part attached to a bone part by coming into contact with an outer peripheral surface of the bone part of bone-in meat that moves relatively with respect to the meat separator, the meat separator including a plurality of clamp blocks in which each of the plurality of clamp blocks include a scraping contact portion that comes into contact with the outer peripheral surface of the bone part and in which each of the scraping contact portions cooperate with each other so as to clamp the outer peripheral surface of the bone part, wherein at least one of the clamp blocks is configured so that at least a part of the scraping contact portion of the clamp block is displaceable in a plurality of directions along an outer surface shape of the bone part, and the at least one of the clamp blocks includes a biasing function portion that is configured to elastically push back the displacement in a direction moving away the bone part.

With the above configuration, in a case where the meat part is separated from the bone part of the bone-in meat, the scraping contact portion of the plurality of clamp blocks come into contact with the outer peripheral surface of the bone part of the bone-in meat, and in this state, the bone part moves relative to the meat separator. At this time, the at least one of the clamp blocks is displaced in the plurality of directions along the outer surface shape of the bone part while at least a part of the scraping contact portion is receiving a biasing force from the biasing function portion. Accordingly, the scraping contact portions of the plurality of clamp blocks are elastically pressed against the outer surface of the bone part from the plurality of directions. As a result, the meat part attached to the periphery of the bone part is separated from the bone part from a position close to the bone part in a state where residual meat is small and the separation of the bone part is small.

The meat separator may further include an approaching device that is configured to relatively displace the at least one of the clamp blocks closer to other clamp blocks, wherein the at least one of the clamp blocks may include a pair of clamp claws that are configured to be displaceable in a direction intersecting with an approaching displacement direction in which the at least one of the clamp blocks is relatively displaced closer to the other clamp blocks, and a spring member that is configured to bias the pair of clamp claws in a direction in which the pair of clamp claws approach each other, wherein the pair of clamp claws may be provided with contact blades that form a concave bone part receiving portion that receives the outer peripheral surface of the bone part between the pair of clamp claws, wherein the spring member may constitute the biasing function portion, and wherein the contact blade of each of the clamp claws may constitute the scraping contact portion.

In this case, the at least one of the clamp blocks and the other of the clamp blocks are relatively displaced in the direction approaching each other by the approaching device, and the scraping contact portions of the clamp blocks come into contact with the outer peripheral surface of the bone part. At this time, in the at least one of the clamp blocks, the contact blades of the pair of clamp claws constituting the scraping contact portion come into contact with the outer peripheral surface of the bone part, and the outer peripheral surface of the bone part is received in the concave bone part receiving portion formed between the two contact blades. The two contact blades receive the biasing force from the spring member that biases the pair of clamp claws in the direction in which the pair of clamp claws approach each other and are pressed against the outer peripheral surface of the bone part in the direction intersecting with the approaching displacement direction. As a result, the scraping contact portions of the plurality of clamp blocks come into contact with the outer peripheral surface of the bone part in the plurality of directions.

The meat separator may further include an approaching device that is configured to relatively displace the at least one of the clamp blocks closer to other clamp blocks, wherein the scraping contact portion of the at least one of the clamp blocks may be constituted by an elastic member that elastically deforms so as to follow a shape of the outer peripheral surface of the bone part by coming into contact with the outer peripheral surface of the bone part, and wherein the biasing function portion may also be constituted by the elastic member.

In this case, when the at least one of the clamp blocks and the other of the clamp blocks are relatively displaced in the direction in which the at least one of the clamp blocks and the other clamp blocks approaches each other by the approaching device, the elastic member provided in the at least one of the clamp blocks elastically deforms so as to follow the shape of the outer peripheral surface of the bone part by coming into contact with the outer peripheral surface of the bone part. At this time, the elastic member is pressed against the outer peripheral surface of the bone part from the plurality of directions due to its own elasticity. As a result, the scraping contact portions (including the elastic member) of the plurality of clamp blocks come into contact with the outer peripheral surface of the bone part in the plurality of directions.

The approaching device may include a biasing part that biases the at least one of the clamp blocks and the other clamp blocks in a direction in which the at least one of the clamp blocks and the other clamp blocks approach each other.

In this case, the at least one of the clamp blocks and the other of the clamp blocks are biased in the direction in which the at least one of the clamp blocks and the other clamp blocks approach each other by the biasing part. For this reason, entire of the clamp blocks are displaced so as to flexibly follow the outer surface shape of the bone part while the scraping contact portions of the clamp block are pressed against the outer peripheral surface of the bone part in multiple directions. As a result, the scraping contact portions are not pressed against the bone part with an excessive force, and thus it possible to prevent damage or nicks to the bone part in advance.

According to the present invention, there is provided a meat part separating apparatus for bone-in meat including: a bone part holding device that is configured to hold a bone part of the bone-in meat; any one of the meat separators described above; and a moving device that is configured to relatively move the bone part holding device and the meat separator approximately in a longitudinal direction of the bone part held by the bone part holding device.

Advantageous Effects of Invention

In the meat separator and the meat part separating apparatus for bone-in meat according to the present invention, at least a part of the scraping contact portion of the clamp block is displaceable in the plurality of directions along the outer surface shape of the bone part, and the displacement in a direction of separating from the bone part is elastically pushed back by the biasing function portion. For this reason, when the meat part is separated off the bone part of the bone-in meat, the scraping contact portions of the plurality of clamp blocks are pressed against the outer peripheral surface of the bone part from the plurality of directions. Therefore, in a case where the meat separator and the meat part separating apparatus for bone-in meat according to the present invention are adopted, the scraping contact portions come into closer contact with the outer peripheral surface of the bone part, and the meat part can be efficiently and stably separated off the bone part of the bone-in meat.

DESCRIPTION OF EMBODIMENTS

Hereinafter, embodiments of the present invention will be described with reference to the drawings. The materials, shapes, relative arrangements, and the like of the components described in the following embodiments are not intended to limit the scope of the present invention unless otherwise specified.

Further, in each of the embodiments which will be described below, common reference signs will be given to the same parts, and some duplicate explanations will be omitted.

First Embodiment

Figure 1:
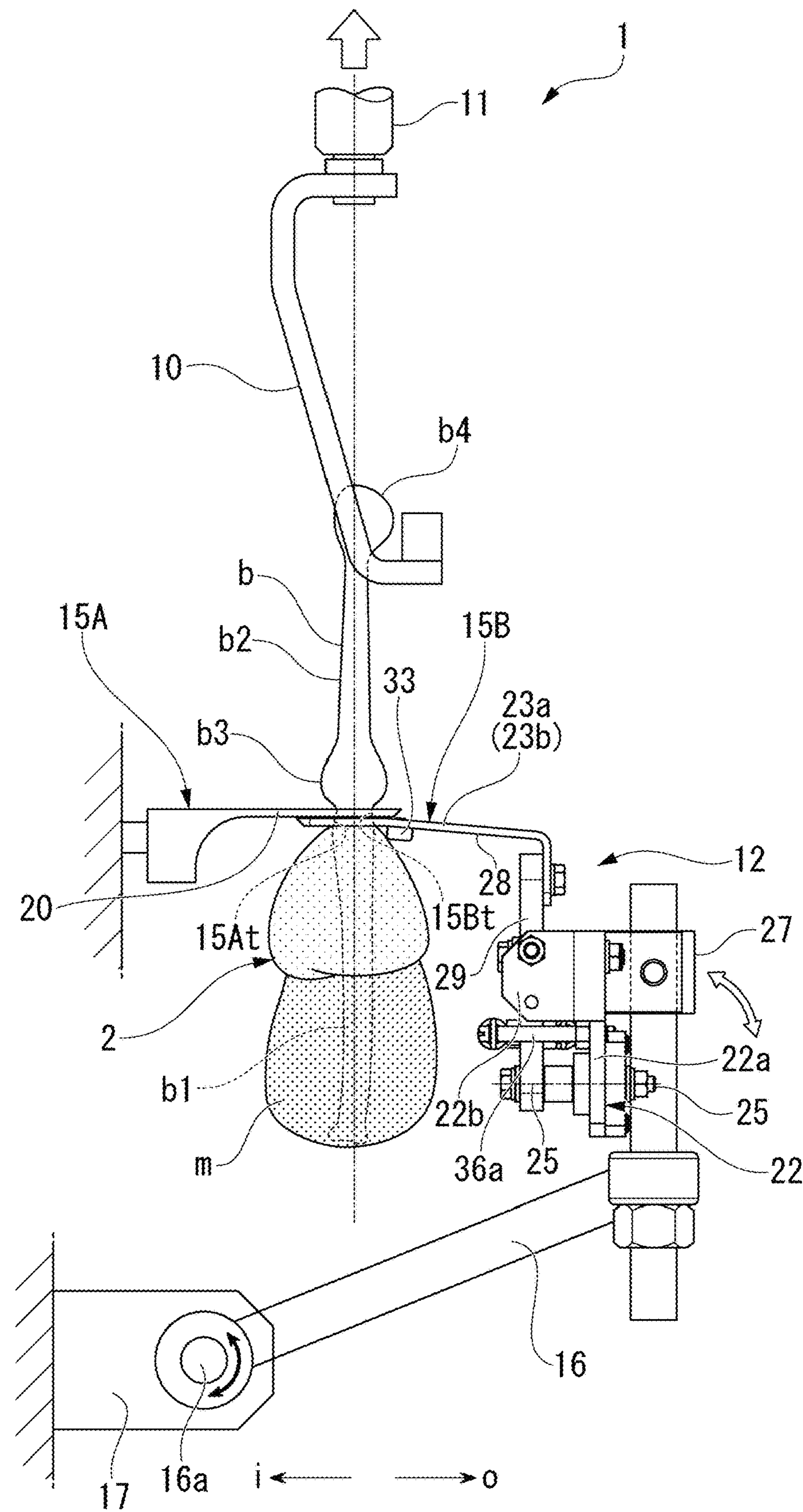
FIG. 1 is a side view of a meat part separating apparatus according to a first embodiment.

FIG. 1 is a side view of a meat part separating apparatus for bone-in meat 1 (hereinafter referred to as a "meat part separating apparatus 1") of the present embodiment.

The meat part separating apparatus 1 is an apparatus for separating a meat part m off a bone part b of bone-in meat 2 such as chicken leg meat. Hereinafter, chicken leg meat will be described as an example of the bone-in meat 2. In the chicken leg meat (the bone-in meat 2), a femur b1 and a tibia b2 are connected to each other by a knee joint b3, and an ankle b4 is connected to the end portion of the tibia b2.

The meat part separating apparatus 1 shown in FIG. 1 includes a clamper 10 (a bone part holding device) that holds the ankle b4 (the bone part b) with the bone-in meat 2 facing downward, a lifting device 11 (a moving device) that raises and lowers the clamper 10, and a meat separator 12 that separates the meat part m off the bone part b of bone-in meat 2 in cooperation with the rising movement of the clamper 10.

FIG. 1 shows the meat part separating apparatus 1 disposed at a processing station where the meat part m of the bone-in meat 2 is separated in the vicinity of the knee joint b3. In practice, as a step before performing the above processing with the meat part separating apparatus 1 shown in FIG. 1, incision processing with respect to the meat part m around the end portion on a side of the ankle b4 of the tibia b2, tendon cutting processing of the meat part m in a longitudinal direction of the bone part b, separating processing of the meat part m around the tibia b2, or the like is performed at a different processing station. Between the processing stations, the common clamper 10 moves while holding the ankle b4 of the bone-in meat 2.

The clamper 10 has a structure capable of holding and releasing the ankle b4 of the bone-in meat 2.

The lifting device 11 moves the bone part b of the bone-in meat 2 relative to the meat separator 12 in a vertical direction by raising the clamper 10 that holds the bone b (the ankle b4) of the bone-in meat 2 at a predetermined speed. In the present embodiment, the lifting device 11 raises the bone part b of the bone-in meat 2 upward with respect to the meat separator 12 whose position in the vertical direction is fixed, and thus it is possible for the meat separator 12 to separate the meat part m.

However, it is also possible to fix the bone part b of the bone-in meat 2 with the clamper 10 and to move the meat separator 12 downward. Further, it is also possible to arrange the bone-in meat 2 laterally such that the longitudinal direction of the bone part b is substantially horizontal and to relatively move the bone part b of the bone-in meat 2 and the meat separator 12 in a substantially horizontal direction.

The meat separator 12 includes a fixed clamp block 15A that is fixed to the factory equipment, and a movable clamp block 15B that is displaceable in a direction of approaching the fixed clamp block 15A and a direction of separating from the fixed clamp block 15A. Hereinafter, for convenience of explanation, in a left-right direction in FIG. 1, a side on which the fixed clamp block 15A is disposed is referred to as an "equipment inside i", and a side on which the movable clamp block 15B is disposed is referred to as an "equipment outside o".

The fixed clamp block 15A and the movable clamp block 15B are provided with scraping contact portions 15At and 15Bt that come into contact with the outer peripheral surface of the bone part b of the bone-in meat 2 at their mutually opposing tip end portions. The scraping contact portions 15At and 15*t* of both crank blocks 15A and 15B are pressed against the outer peripheral surface of the bone part b of the bone-in meat 2 so as to clamp the outer peripheral surface of the bone part b therebetween through their mutual cooperation.

The movable clamp block 15B is supported by a substantially L-shaped rotation arm 16. The movable clamp block 15B swings around a rotation shaft 16*a* at the base end of the rotation arm 16 so as to approach and move away from the fixed clamp block 15A. In the case of the present embodiment, the rotation shaft 16*a* of the rotation arm 16 is disposed at a lower position than the fixed clamp block 15A and is rotated by an air cylinder 17 having a biasing part such as a spring member. The rotation arm 16 swings around the rotation shaft 16*a* by the operation of the air cylinder 17, and thus displaces the movable clamp block 15B at the tip end side in a direction which approaches the fixed clamp block 15A (a direction toward the equipment inside i) or in a direction which separates from the fixed clamp block 15A (in a direction toward the equipment outside o).

In a state where the movable clamp block 15B has approached the fixed clamp block 15A, when the scraping contact portion 15Bt comes into contact with the outer peripheral surface of the bone part b of the bone-in meat 2 and receives a reaction force from the bone part b, the movable clamp block 15B is pushed back in the direction of separating (the direction toward the equipment outside o) against a biasing force of the biasing part of the air cylinder 17. At this time, the movable clamp block 15B is displaced in the direction toward the equipment outside o along the outer surface shape of the bone part b, while the scraping contact portion 15Bt is pressed against the outer surface of the bone part b by an appropriate biasing force.

In the present embodiment, the air cylinder 17 and the rotation arm 16 constitute an approaching device that displaces the movable clamp block 15B relatively close to the fixed clamp block 15A. However, the approaching device is not limited to this configuration, and may have any other configuration as long as it can displace the movable clamp block 15B relatively close to the fixed clamp block 15A. For example, the approaching device may be a device that horizontally moves the movable clamp block 15B in a direction of the equipment inside i and in a direction of the equipment outside o.

Figure 2:
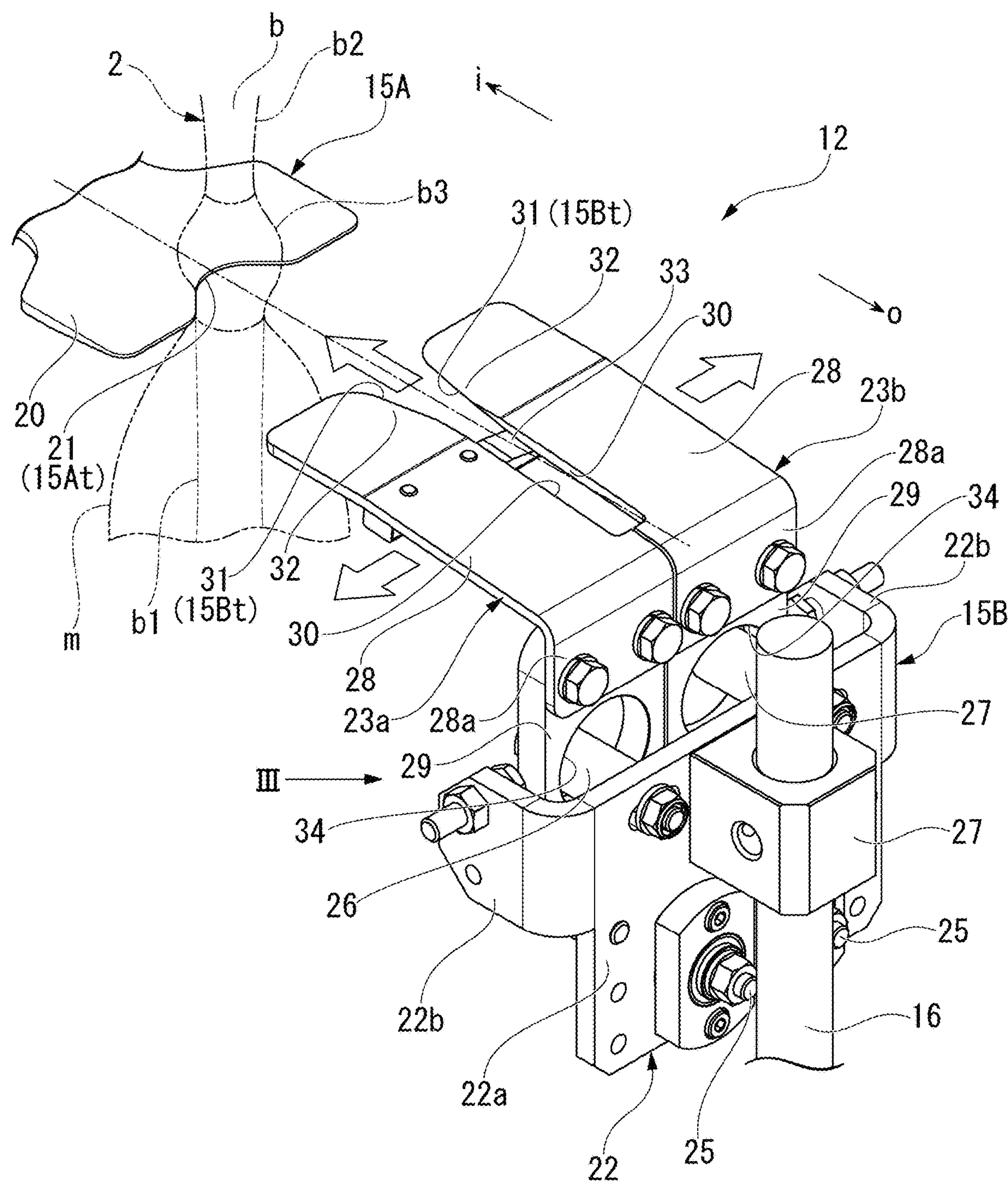
FIG. 2 is an oblique view of a meat separator of the first embodiment.
Figure 3:
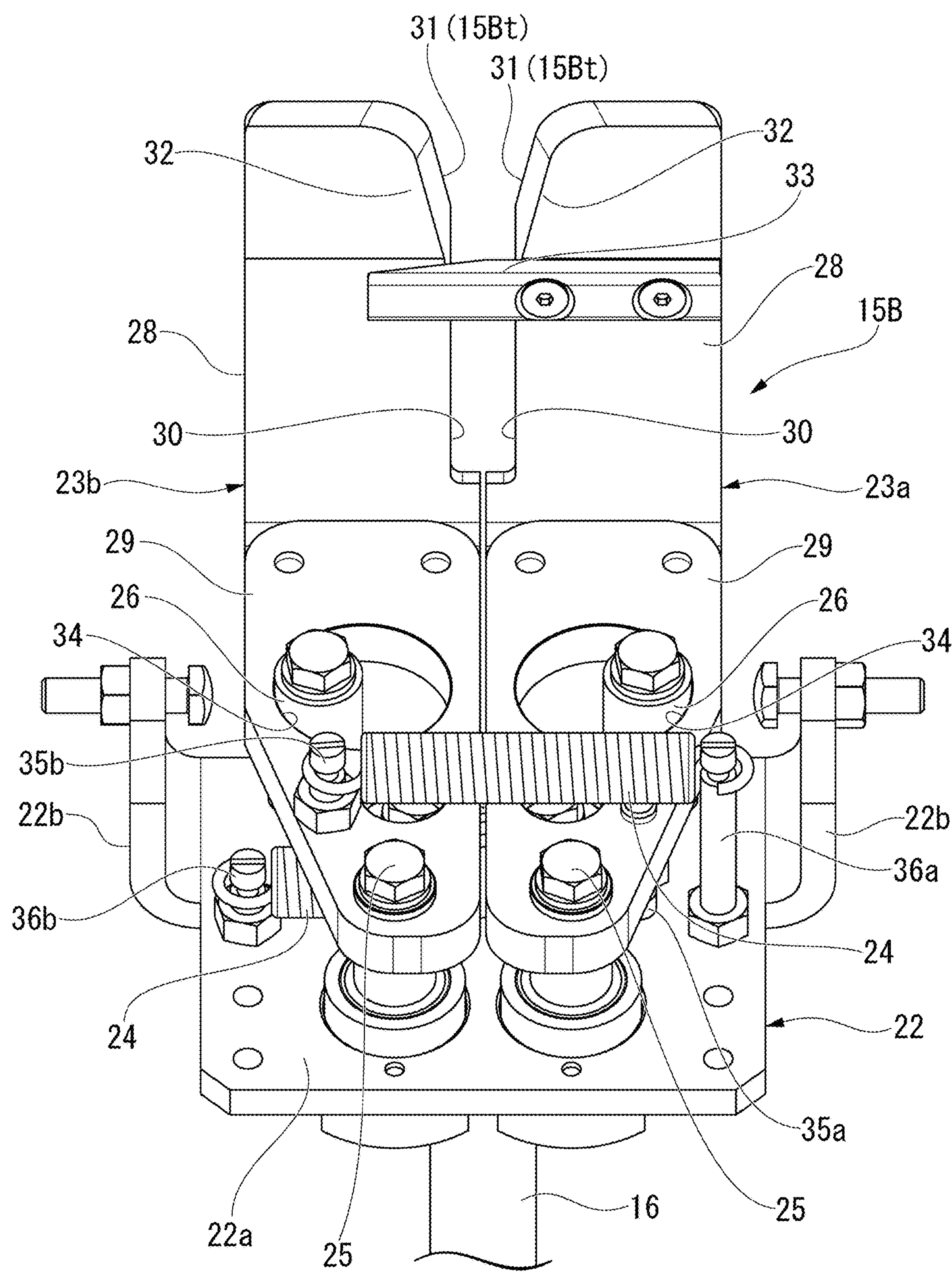
FIG. 3 is a view of a movable clamp block of the first embodiment viewed in a direction of arrow III in FIG. 2.
Figure 4:
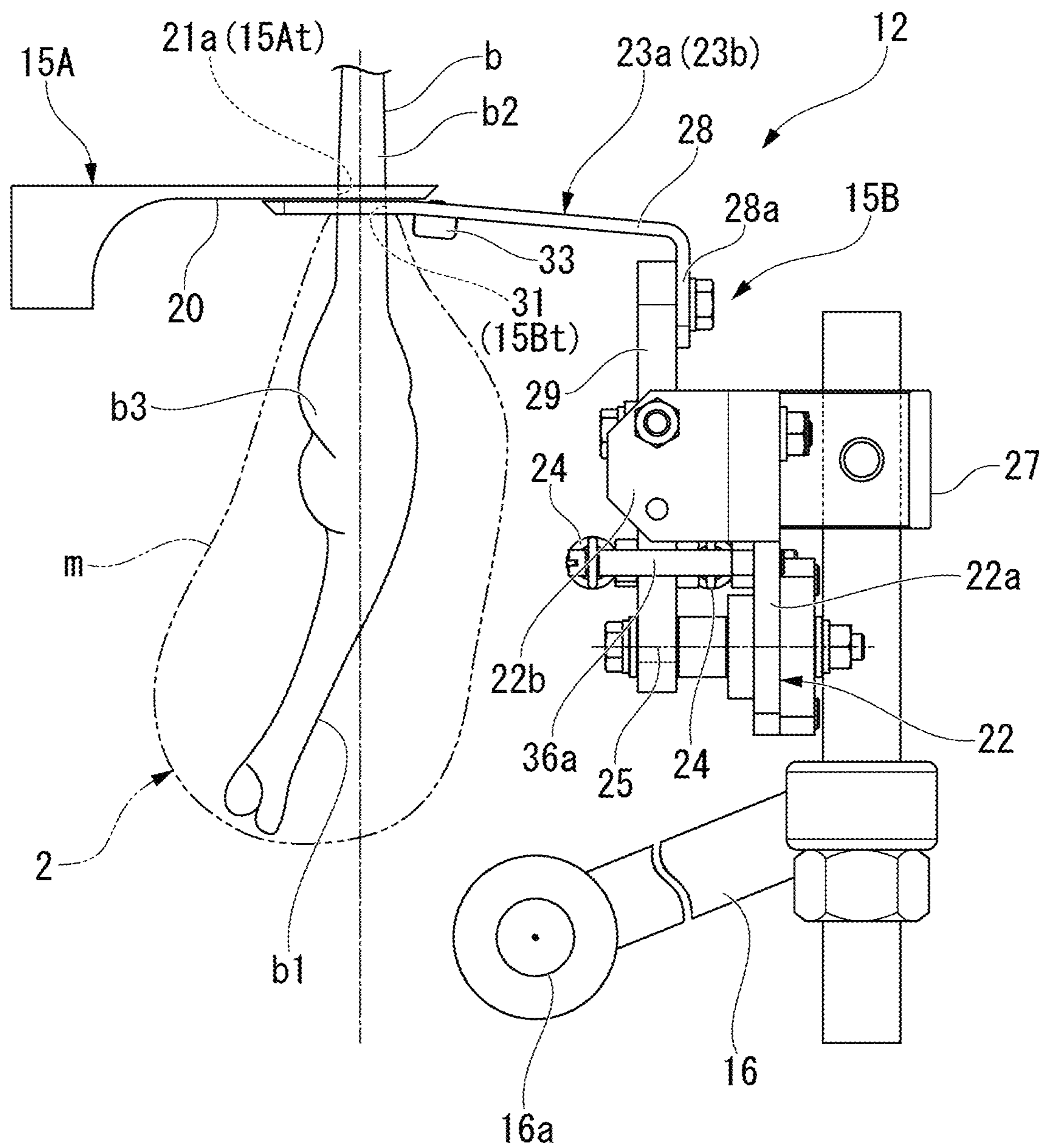
FIG. 4 is a side view showing the behavior of the meat separator of the first embodiment.
Figure 5:
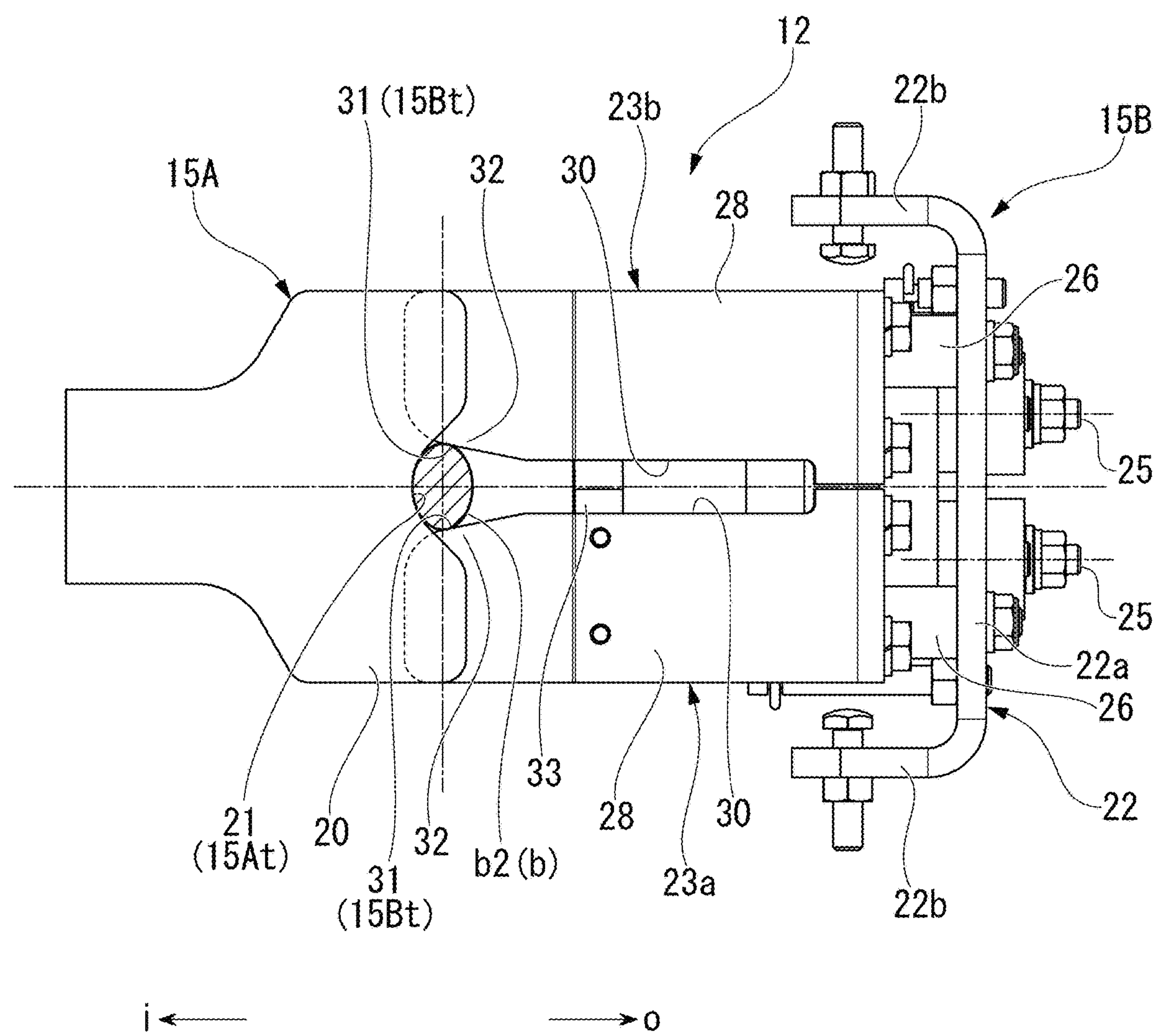
FIG. 5 is a plan view showing the same behavior of the meat separator of the first embodiment as shown in FIG. 4.

FIG. 2 is an oblique view of the meat separator 12, and FIG. 3 is a view of the movable clamp block 15B viewed in a direction of arrow III in FIG. 2. FIG. 4 is a side view showing the behavior of the meat separator 12, and FIG. 5 is a plan view showing the same behavior of the meat separator 12 as shown in FIG. 4. In the following explanation of the fixed clamp block 15A and the movable clamp block 15B, a direction in which the fixed clamp block 15A and the movable clamp block 15B face each other is referred to as a "direction of approach and separation of the block," and a direction orthogonal to the vertical direction and the direction of approach and separation of the block are referred to as a "width direction."

The fixed clamp block 15A includes a plate-shaped fixed clamp claw 20 extending substantially horizontally from a fixed wall of the factory equipment toward the equipment outside o. The fixed clamp claw 20 has a concave bone part receiving portion 21 that opens toward the equipment outside o at its tip end portion (an extending end portion). As shown in FIG. 5, the bone part receiving portion 21 is formed, for example, in a substantially U-shaped planar shape that opens gently outward in the width direction. The outer peripheral surface of the bone part b of the bone-in meat 2 suspended and supported by the clamper 10 is received in the bone part receiving portion 21. The scraping contact portion 15At on the side of the fixed clamp block 15A is constituted by a bone part receiving portion 21.

The movable clamp block 15B has a thick support plate 22 connected to the tip end portion of the rotation arm 16, a pair of clamp claws 23*a* and 23*b* rotatably supported by the support plate 22, and a pair of spring members 24 biasing the pair of clamp claws 23*a* and 23*b* in a direction in which they approach each other.

The support plate 22 includes a rectangular plate base 22*a* and side cover walls 22*b* that extend in a substantially L shape from both end portions of the plate base 22*a* in the width direction.

The support plate 22 is in an erect posture such that the plate base 22*a* is along the tip end portion of the rotation arm 16 in a state in which the tip end portion of the rotation arm 16 is erected vertically upward. Hereinafter, the side of the plate base 22*a* facing the fixed clamp block 15A is referred to as a "front surface," and the side opposite thereto is referred to as a "back surface."

Figure 6:
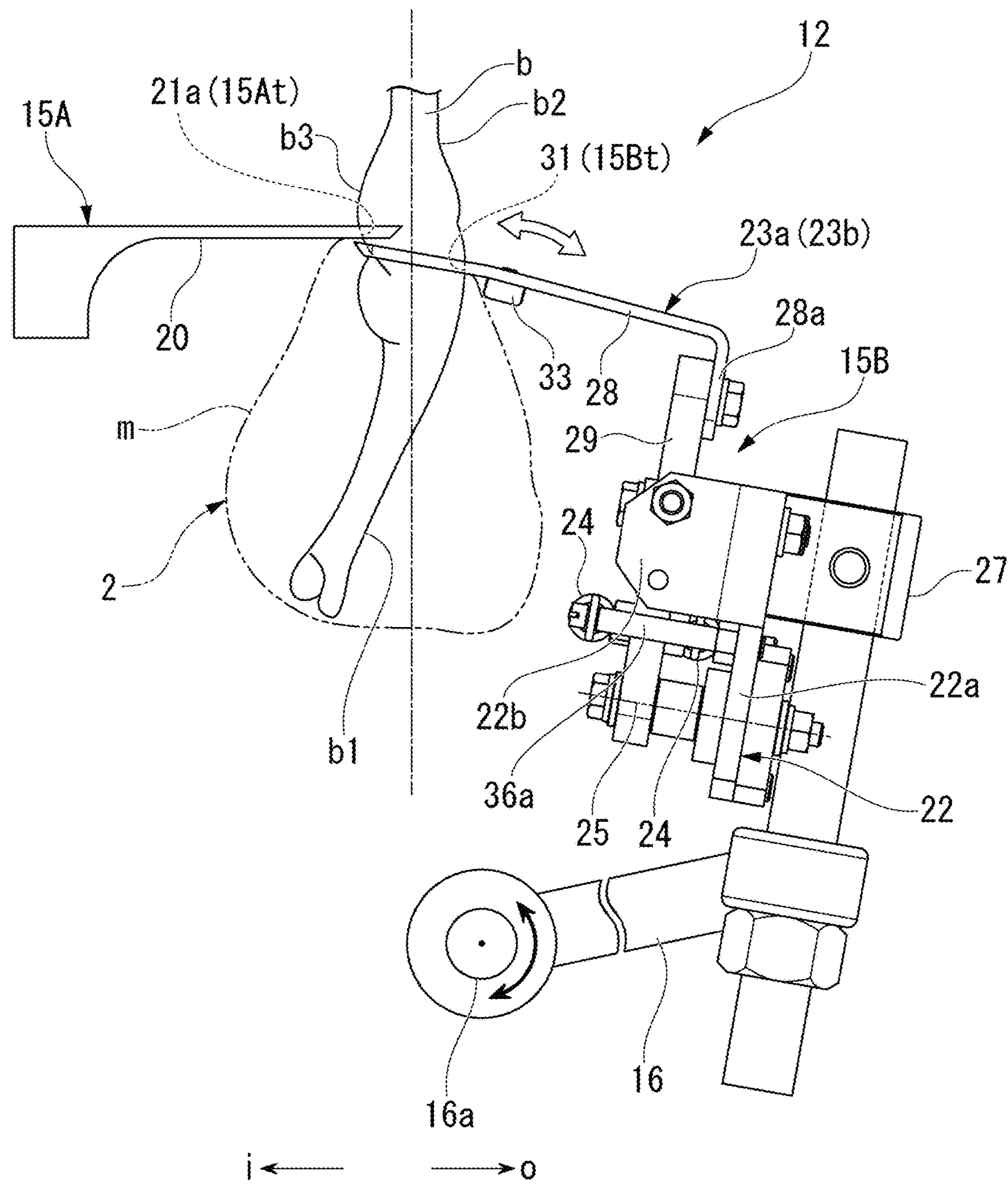
FIG. 6 is a side view showing another behavior of the meat separator of the first embodiment.

A pair of pivot shafts 25 that rotatably support the clamp claws 23*a* and 23*b*, and a pair of regulation shafts 26 that regulate each rotational displacement of the clamp claws 23*a* and 23*b* are projected from the front surface of the plate base 22*a*. The pivot shaft 25 and the regulation shaft 26 protrude in a direction orthogonal with respect to the front surface of the plate base 22*a*. Further, as shown in FIGS. 2, 4, 6, and the like, a connection block 27 to which the tip end portion of the rotation arm 16 is connected is attached at the center position in the width direction of the back surface of the plate base 22*a*.

Each of the clamp claws 23*a* and 23*b* includes a thin strip-shaped claw main body 28 extending in the direction of approach and separation of the block in a state the tip end portion of the rotation arm 16 is erected and a thick strip-shaped support piece 29 to which one end portion in a longitudinal direction of the claw main body 28 is connected. Regarding the claw main body 28, the side connected to the support piece 29 is referred to as a "base end portion," and the side opposite thereto is referred to as a "tip end portion." A connection portion 28*a* bent into substantially an L shape is integrally formed at the base end portion of the claw main body 28. The connection portion 28*a* is bolted to one end portion of the support piece 29 in the longitudinal direction. In this state, each of the clamp claws 23*a* and 23*b* is an integral block having substantially an L shape when viewed from the side.

The pair of clamp claws 23*a* and 23*b* are rotatably connected to the corresponding pivot shaft 25 of the support plate 22 at the other end side (the lower end side in FIG. 3) of each support piece 29 in the longitudinal direction. The pair of pivot shafts 25 on the side of the support plate 22 are disposed side by side in the width direction at two positions spaced apart in the width direction on the front surface of the plate base 22*a*. The two support pieces 29 supported by the pivot shafts 25 are disposed side by side in the width direction on the front side of the plate base 22*a* of the support plate 22. The pair of clamp claws 23*a* and 23*b* are displaceable between an approaching position at which the claw main bodies 28 approaching each other in the width direction and a separating position at which the claw main bodies 28 separate from each other in the width direction by rotating around the pivot shafts 25.

Each of the claw main bodies 28 of the clamp claws 23*a* and 23*b* has a cutout portion 30 that extends from near the base end portion toward the tip end portion side in a side edge portion adjacent to another claw main body 28 (hereinafter referred to as an "inner side edge"). The separation width between the cutout portions 30 of the two adjacent claw main bodies 28 in the width direction is a constant separation width from the base end portion to a predetermined position near the tip end portion and gradually increases toward the tip end portion on the tip end portion side beyond the predetermined position. A region of the two adjacent claw main bodies 28 where the separation width between the cutout portions 30 gradually increases toward the tip end portion is a concave bone part receiving portion 31 that receives the outer peripheral surface of the bone part b of the bone-in meat 2 between the two adjacent claw main bodies 28. The side edge portion of each of the two adjacent claw main bodies 28 that forms the bone part receiving portion 31 has a thickness that gradually decreases toward an end portion that forms an edge of the cutout portion 30. This portion of the claw main body 28 is a contact blade 32 that comes into contact with the outer peripheral surface of the bone-in meat 2. The bone part receiving portion 31 is formed by the contact blades 32 of the two clamp claws 23*a* and 23*b*.

In the present embodiment, the contact blades 32 of the two clamp claws 23*a* and 23*b* form the scraping contact portion 15Bt in the movable clamp block 15B.

Moreover, a regulation piece 33 extending in the width direction is attached to one clamp claw 23*a* so as to straddle the cutout portion 30 between the two clamp claws 23*a* and 23*b*. The regulation piece 33 regulates the bone part b and the meat part m from being caught in a deep position on the base side of the cutout portion 30 between the two clamp claws 23*a* and 23*b* during the separating operation of the meat part m of the bone-in meat 2 by the meat separator 12.

As shown in FIGS. 2 and 3, an insertion hole 34 that penetrates the support piece 29 in a thickness direction and that has a circular shape in a front view is formed in the support piece 29 of each clamp claw 23*a*. Each regulation shaft 26 that is projected from the plate base 22*a* of the support plate 22 is inserted into the insertion hole 34 of each support piece 29. The outer surface of the corresponding regulation shaft 26 comes into contact with the inner wall of the insertion hole 34 when the pair of clamp claws 23*a* and 23*b* are displaced to the most separating position and are displaced to the most approaching position. As a result, the displacement of the pair of clamp claws 23*a* and 23*b* in the direction of separating and the displacement in the direction of approaching are regulated.

The outer surface of the corresponding regulation shaft 26 may come into contact with the inner wall of the insertion hole 34 only when the pair of clamp claws 23*a* and 23*b* are displaced to the most separating position.

Further, as shown in FIG. 3, spring locking projections 35*a* and 35*b* are projected from the support pieces 29 of the clamp claws 23*a* and 23*b*, respectively. The spring locking projection 35*a* of one clamp claw 23*a* protrudes toward the back surface side of the clamp claw 23*a*, and the spring locking projection 35*b* of the other clamp claw 23*b* protrudes toward the front side of the clamp claw 23*b*. Furthermore, a pair of spring locking projections 36*a* and 36*b* are projected from the front surface of the plate base 22*a* of the support plate 22. One spring locking projection 36*a* is disposed at a position spaced apart from the support piece 29 of one clamp claw 23*a* outside in the width direction (at the side separating from the support piece 29 of the other clamp claw 23*b*). The other spring locking projection 36*b* is disposed at a position spaced apart from the support piece 29 of the other clamp claw 23*b* outside in the width direction (at the side away from the support piece 29 of the one clamp claw 23*a*).

The end portions of the spring member 24 such as a compression coil spring are locked to the spring locking projection 35*a* of one clamp claw 23*a* and the spring locking projection 36*b* of the plate base 22*a*. The end portions of a similar spring member 24 such as a compression coil spring is locked to the spring locking projection 35*b* of the other clamp claw 23*b* and the spring locking projection 36*a* of the plate base 22*a*. The two spring members 24 bias the clamp claws 23*a* and 23*b* in a direction in which the two clamp claws 23*a* and 23*b* approach each other. Specifically, since the two clamp claws 23*a* and 23*b* are rotatably supported by the pivot shafts 25 on the support plate 22, the two spring members 24 bias the two clamp claws 23*a* and 23*b* so as to narrow the opening angle of the two clamp claws 23*a* and 23*b*.

In the present embodiment, the two clamp claws 23*a* and 23*b* are biased in the direction of approaching by the two spring members 24 whose one ends are supported by the support plate 22, but both end portions of one spring member 24 may be connected to each of the two clamp claws 23*a* and 23*b*.

Figure 7:
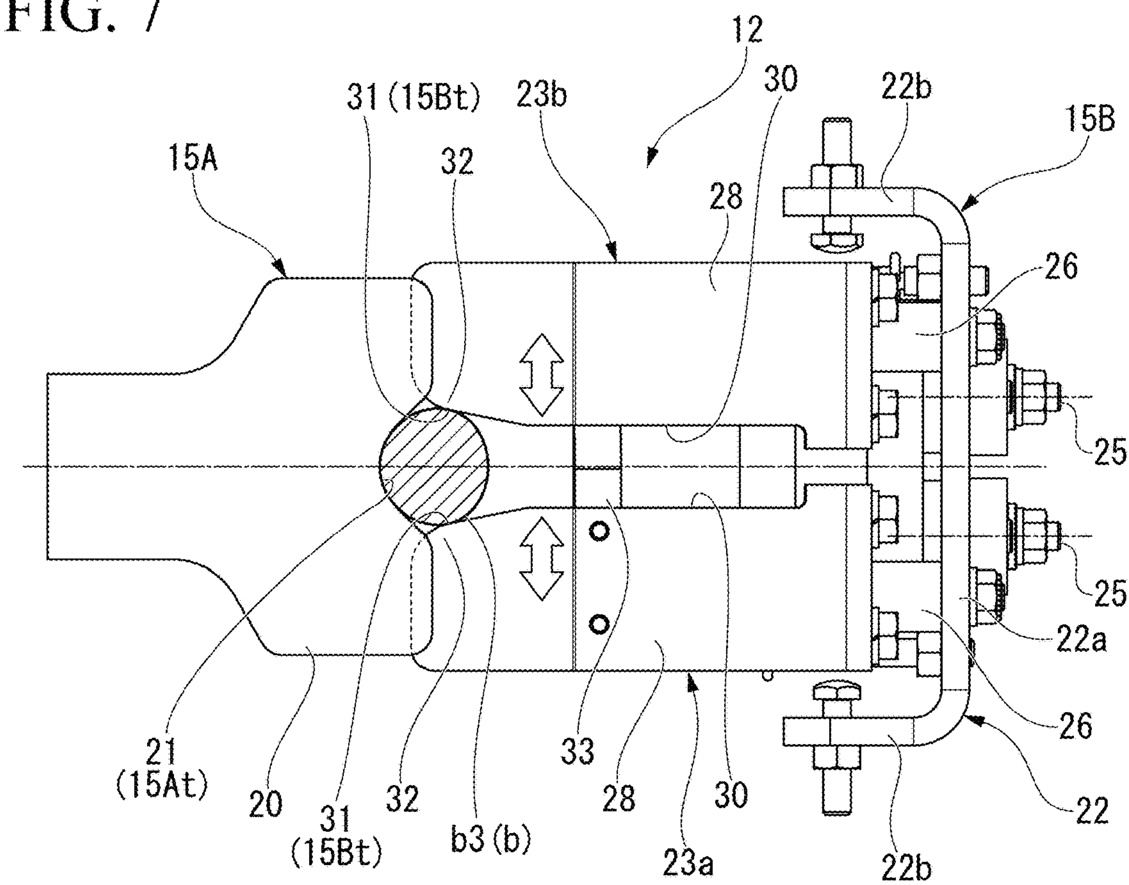
FIG. 7 is a plan view showing the same behavior of the meat separator of the first embodiment as shown in FIG. 6.

FIGS. 4 and 5 are diagrams showing the behavior of the meat separator 12 when separating the meat part m around the tibia b2 of the bone-in meat 2, and FIGS. 6 and 7 are diagrams showing the behavior of the meat separator 12 when separating the meat part and the membrane around the knee joint b3 of the bone-in meat 2. FIG. 6 is a side view of the meat separator 12 similar to FIG. 4, and FIG. 7 is a plan view of the meat separator 12 similar to FIG. 5.

Hereinafter, with appropriate reference to FIGS. 4 to 7 and FIG. 1, the processing of the bone-in meat 2 by the meat part separating apparatus 1 will be described.

First, the movable clamp block 15B is separated from the fixed clamp block 15A by operating the air cylinder 17.

In this state, the bone-in meat 2 that has undergone the incision processing around the ankle b4 and the incision processing along the bone part b is held by the clamper 10 and descends toward the meat separator 12. In this way, when the incision portion of the meat part m of the bone-in meat 2 descends to the height position of the fixed clamp block 15A of the meat separator 12, the movable clamp block 15B is displaced close to the fixed clamp block 15A by the operation of the air cylinder 17. As a result, through the incision portion of the bone-in meat 2, the bone part receiving portion 21 (the scraping contact portions 15At) of the fixed clamp block 15A and the bone part receiving portion 31 (the scraping contact portion 15Bt) of the movable clamp block 15B come into contact with the outer surface of the bone part b so as to surround the outer peripheral surface of the bone part b (the tibia b2) of the bone-in meat 2.

At this time, the operation of the air cylinder 17 is stopped, and the biasing force of the biasing part of the air cylinder 17 causes the bone part receiving portion 31 (the scraping contact portion 15Bt) of the movable clamp block 15B to be pressed against the outer peripheral surface of the bone part b.

Moreover, the bone part receiving portion 31 (the scraping contact portion 15Bt) of the movable clamp block 15B is formed by the contact blades 32 of the clamp claws 23*a* and 23*b*, and thus, at this time, the pair of clamp claws 23*a* and 23*b* receive a reaction force in a separating direction from the bone part b while receiving the biasing force of the spring member 24. For this reason, the contact blades 32 of the pair of clamp claws 23*a* and 23*b* which constitute the bone part receiving portion 31 are elastically pressed against the outer surface of the bone part b in the direction of approach and separation of the block and the width direction.

In this state, the bone-in meat 2 held by the clamper 10 is raised by the operation of the lifting device 11. At this time, as shown in FIGS. 4 and 5, in a state where the bone part receiving portions 21 and 31 of the fixed clamp block 15A and the movable clamp block 15B are pressed against the outer surface of the tibia b2, only the bone part b is pulled upward. For this reason, the meat part m attached to the periphery of the tibia b2 is scraped off the periphery of the tibia b2 by the meat separator 12. Moreover, at this time, the clamp claws 23*a* and 23*b* of the movable clamp block 15B are elastically pressed against the outer surface of the bone part b in the direction of approach and separation of the block and in the width direction, and thus the clamp claws 23*a* and 23*b* reliably come into close contact with the outer surface of the tibia b2 even if the outer diameter or shape of the tibia b2 changes slightly in the longitudinal direction.

In this way, the meat part m scraped off the tibia b2 overlaps the outer surface of the meat part m on the femur b1 side in a state in which its front and back reversed.

Thereafter, when the bone-in meat 2 held by the clamper 10 is further raised by the operation of the lifting device 11, the bone part receiving portion 21 and 31 of the fixed clamp block 15A and the movable clamp block 15B reach a large bulged portion of the knee joint b3 of the bone-in meat 2. At this time, as shown in FIGS. 6 and 7, the pair of clamp claws 23*a* and 23*b* of the movable clamp block 15B receive a contact reaction force from the bulged portion of the knee joint b3, are displaced to move backward in the direction of approach and separation of the block against the force of the biasing part of the air cylinder 17, and are displaced to be separated from each other in the width direction against the biasing force of the spring member 24.

Thereafter, when the bone-in meat 2 held by the clamper 10 is further raised by the operation of the lifting device 11, the bone part receiving portion 21 and 31 of the fixed clamp block 15A and the movable clamp block 15B are pressed against the outer surface of the femur b1 of the bone-in meat 2, and the meat part m is separated from the periphery of the femur b1.

As described above, the meat separator 12 of the present embodiment is configured such that the scraping contact portion 15Bt (the contact blades 32 of the clamp claws 23*a* and 23*b*) of the movable clamp block 15B is displaceable in a plurality of directions along the outer surface shape of the bone part b of the bone-in meat 2 and the displacement in the direction moving away from the bone part b is elastically pushed back by the spring member 24 which is a biasing function portion. For this reason, when the meat part m is separated from the bone part b of the bone-in meat 2, the scraping contact portions 15At and 15Bt of the fixed clamp block 15A and the movable clamp block 15B are pressed against the outer peripheral surface of the bone part b from the plurality of directions. Therefore, in a case where the meat separator 12 of the present embodiment is adopted, the scraping contact portions 15At and 15Bt come into closer contact with the outer peripheral surface of the bone part b, and the meat part m can be efficiently and stably separated from the bone part b of the bone-in meat 2. As a result, it is possible to minimize the occurrence of a phenomenon in which the meat part m remains largely attached to the bone part b, or a phenomenon in which some of the separated bone part b remains as residual bone in the meat part m.

Further, the meat separator 12 of the present embodiment includes the approaching device (the air cylinder 17 and the rotation arm 16) that displaces the movable clamp block 15B close to the fixed clamp block 15A, and the movable clamp block 15B includes the pair of clamp claws 23*a* and 23*b* that are relatively displaceable in the width direction and the spring member 24 (the biasing function portion) that biases the pair of the clamp claws 23*a* and 23*b* in the direction in which the pair of the clamp claws 23*a* and 23*b* approach each other. The pair of clamp claws 23*a* and 23*b* are provided with the contact blades 32 that form the concave bone part receiving portion 31 that receives the outer peripheral surface of the bone part b between the contact blades 32. For this reason, when the contact blades 32 of the clamp claws 23*a* and 23*b* are pressed against the outer peripheral surface of the bone part b in the direction in which the blocks approach and separate by the approaching device, the two contact blades 32 come into contact with the outer peripheral surface of the bone part b in the width direction while receiving the biasing force of the spring member 24.

Therefore, in a case where the meat separator 12 of the present embodiment is adopted, it is possible to make the scraping contact portion 15At of the fixed clamp block 15A and the scraping contact portion 15Bt of the movable clamp block 15B follow the outer surface shape of the bone part b and reliably come into contact therewith in the plurality of directions.

Furthermore, in the meat separator 12 of the present embodiment, by appropriately changing the spring member 24 to one having a different spring constant, the pressing force of the contact blades 32 against the outer peripheral surface of the bone part b can be easily changed.

Furthermore, in the meat separator 12 of the present embodiment, the air cylinder 17 that constitutes the approaching device incorporates the biasing part for biasing the movable clamp block 15B in the direction toward the fixed clamp block 15A. For this reason, the scraping contact portion 15Bt (the contact blades 32) flexibly follows the outer surface shape of the bone part b to be displaced in the direction in which the blocks approach and separate and in the width direction while the scraping contact portion 15Bt (the contact blades 32) of the movable clamp block 15B is pressed against the outer surface of the bone part b. As a result, the scraping contact portions 15At and 15Bt are not pressed against the bone part b with an excessive force, and thus it possible to prevent damage or nicks to the bone part b in advance.

Second Embodiment

Figure 8:
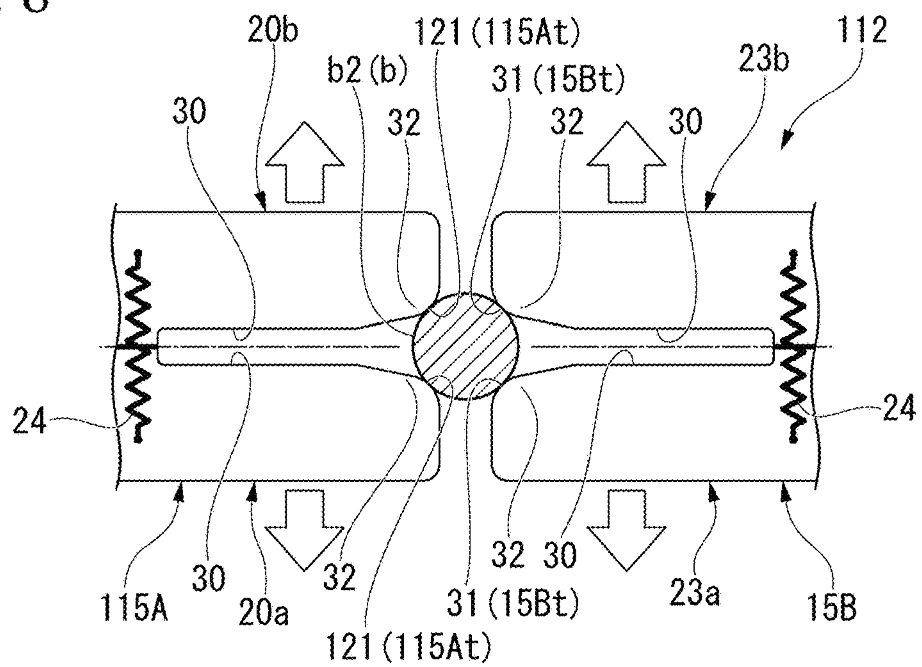
FIG. 8 is a plan view of a meat separator of a second embodiment.

FIG. 8 is a plan view of a meat separator 112 of a second embodiment.

In the meat separator 12 of the first embodiment described above, the movable clamp block 15B is configured to include the pair of clamp claws 23*a* and 23*b* that are relatively displaceable in the width direction, and the fixed clamp block 15A is constituted by one fixed clamp claw 20. On the other hand, in the meat separator 112 of the present embodiment, a fixed clamp block 115A is also configured to include a pair of clamp claws 20*a* and 20*b* that are relatively displaceable in the width direction. The pair of clamp claws 20*a* and 20*b* are biased in a direction in which they approach each other by the spring member 24, similarly to the movable clamp block 15B.

The clamp claws 20*a* and 20*b* of the fixed clamp block 115A have the same shape as the clamp claws 23*a* and 23*b* of the movable clamp block 15B. That is, the tip end portions of the clamp claws 20*a* and 20*b* are provided with the contact blades 32 that form a concave bone part receiving portion 121 therebetween.

In the case of the meat separator 112 of the present embodiment, when the scraping contact portion 15Bt of the movable clamp block 15B and the scraping contact portion 115At of the fixed clamp block 115A are pressed against the outer surface of the bone part b by the operation of the approaching device, the pairs of clamp claws 20*a*, 20*b*, 23*a*, and 23*b* of both clamp blocks 115A and 15B are displaced in the width direction against the biasing force of the spring member 24. As a result, the scraping contact portions 115At and 15Bt (the clamp claws 20*a*, 20*b*, 23*a*, and 23*b*) of both clamp blocks 115A and 15B are elastically pressed against the outer peripheral surface of the bone part b in more multiple directions.

Therefore, in a case where the meat separator 112 of the present embodiment is adopted, the scraping contact portions 115At and 15Bt of both clamp blocks 115A and 15B come into close contact with the outer peripheral surface of the bone part b in the more multiple directions, and the meat part m can be more efficiently and stably separated from the bone part b of the bone-in meat 2.

Third Embodiment

Figure 9:
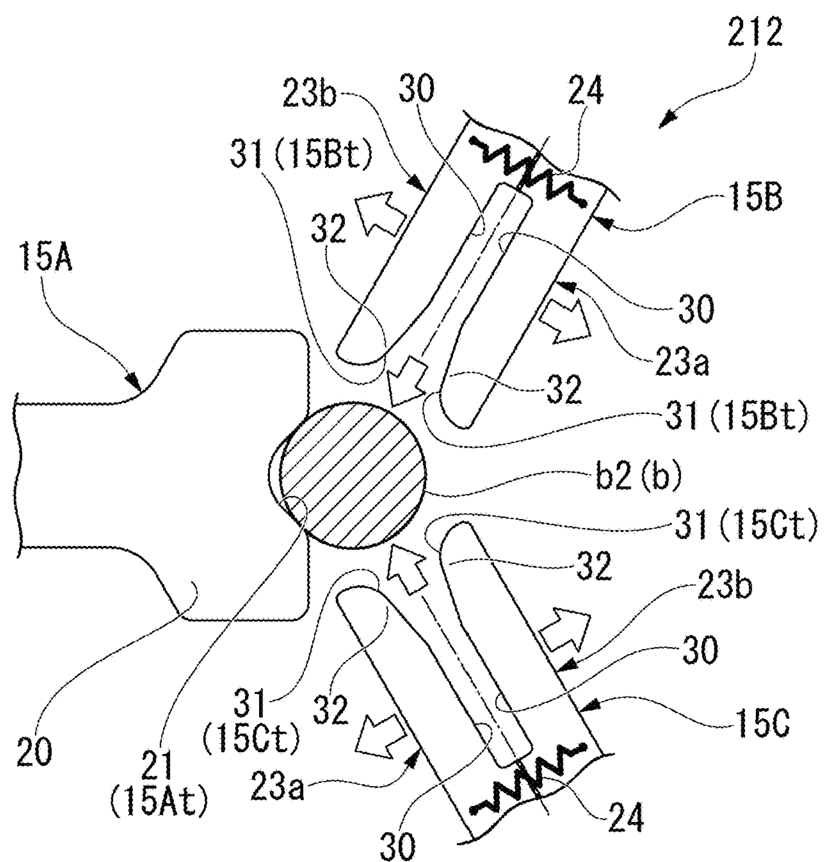
FIG. 9 is a plan view of a meat separator of a third embodiment.

FIG. 9 is a plan view of a meat separator 212 of a third embodiment.

In the meat separator 212 of the present embodiment, two movable clamp blocks 15B and 15C are disposed approximately 120 degrees shifted around the center of the bone part b so as to face the tip end portion of one fixed clamp block. The two movable clamp blocks 15B and 15C have the same structure as the movable clamp block 15B of the first embodiment. The two movable clamp blocks 15B and 15C are moved in a direction approaching the fixed clamp block 15A by an approaching device (not shown). As a result, the scraping contact portions 15Bt and 15Ct of the movable clamp blocks 15B and 15C clamp the outer peripheral surface of the bone part b together with the scraping contact portion 15At of the fixed clamp block 15A. At this time, the pair of clamp claws 23*a* and 23*b* of the each movable clamp block 15B and 15C follow the outer surface shape of the bone part b to be displaced in the width direction while the pair of clamp claws 23*a* and 23*b* are pressed against the outer peripheral surface of the bone part b by the biasing force of the spring member 24.

The meat separator 212 of the present embodiment has the same configuration as the first embodiment except that the two movable clamp blocks 15B and 15C are disposed approximately 120 degrees shifted around the center of the bone part b. For this reason, the meat separator 212 of the present embodiment can obtain the same basic effect as the first embodiment, but it is possible to clamp the outer peripheral surface of the bone part b in three directions by one fixed clamp block 15A and two movable clamp blocks 15B and 15C.

In the meat separator 212 of the present embodiment, the pair of clamp claws 23*a* and 23*b* of the movable clamp blocks 15B and 15C flexibly follows the outer peripheral surface of the bone part b while receiving the biasing force of the spring member 24, and thus the multiple scraping contact portions 15At, 15Bt, and 15Ct can be brought into close contact with the outer peripheral surface of the bone part b in more multiple directions. For this reason, the meat part m can be further efficiently and stably separated from the bone part b of the bone-in meat 2.

Fourth Embodiment

Figure 10:
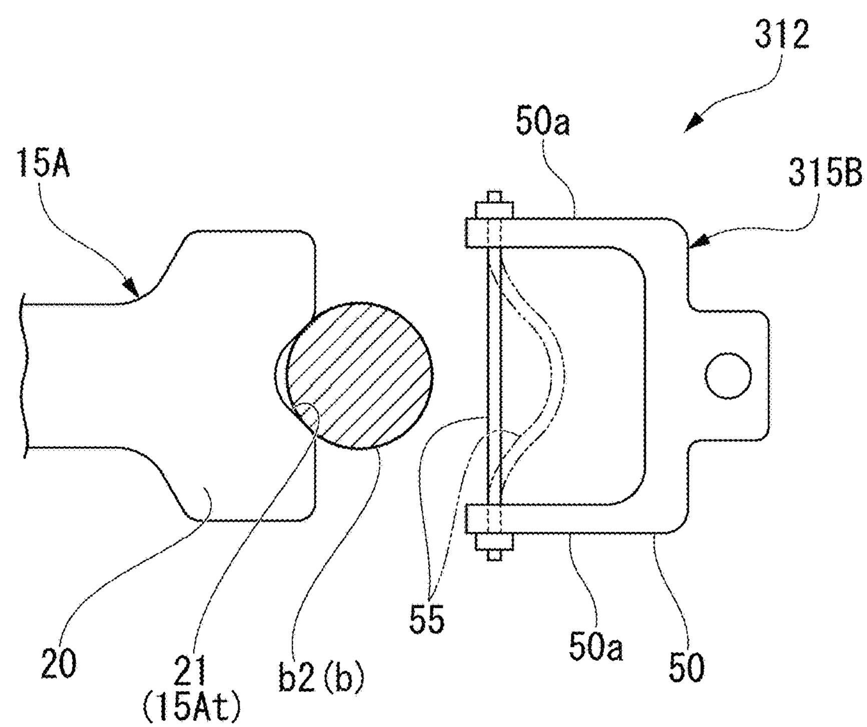
FIG. 10 is a plan view of a meat separator of a fourth embodiment.

FIG. 10 is a plan view of a meat separator 312 of a fourth embodiment.

The meat separator 312 of the present embodiment includes a fixed clamp block 15A that is fixed to the factory equipment, and a movable clamp block 315B that is displaceable in a direction of approaching the fixed clamp block 15A and a direction of separating from the fixed clamp block 15A. The movable clamp block 315B is operated in the approaching direction by an approaching device similarly to the first embodiment described above.

The fixed clamp block 15A has the same structure as that of the first embodiment.

The movable clamp block 315B has a pair of holding arms 50*a* extending in a connecting plate 50 held by the approaching device so as to form a substantially U-shape in a plan view. Both end portions of a metal wire 55, which is a linear elastic member, are fixed to the pair of holding arms 50*a*. The metal wire 55 is held under tension by the pair of holding arms 50*a*.

In the present embodiment, the metal wire 55, which is a linear elastic member, constitutes a scraping contact portion of the movable clamp block 315B. When the metal wire 55 held by the holding arms 50*a* is pressed against the outer peripheral surface of the bone part b of the bone-in meat, the metal wire 55 is elastically deformed along the shape of the outer peripheral surface of the bone part b and comes into close contact with the outer peripheral surface of the bone part b. When the bone part b moves relative to the meat separator 312 in the longitudinal direction in this state, the meat part can be scraped off the bone part b by the metal wire 55. In the present embodiment, the metal wire 55 also constitutes a biasing function portion that elastically pushes back the displacement of the scraping contact portion in a direction of separating from the bone part b.

The approaching device (not shown) that displaces the movable clamp block 315B in the direction toward the fixed clamp block 15A includes a biasing part such as a spring member that biases the movable clamp block 315B in a direction of approaching the fixed clamp block 15A, as in the first embodiment.

As described above, the meat separator 312 of the present embodiment is configured such that the metal wire 55 that is the scraping contact portion of the movable clamp block 315B is displaceable in a plurality of directions along the outer surface shape of the bone part b of the bone-in meat 2 and the displacement in the direction separating from the bone part b is elastically pushed back by the elasticity of the metal wire 55 itself. For this reason, when the meat part is separated from the bone part b of the bone-in meat 2, the scraping contact portion 15At of the fixed clamp block 15A and the metal wire 55 (the scraping contact portion) of the movable clamp block 315B are pressed against the outer peripheral surface of the bone part b from a plurality of directions.

Therefore, in a case where the meat separator 312 of the present embodiment is adopted, the scraping contact portion 15At of the fixed clamp block 15A and the metal wire 55 of the movable clamp block 315B come into closer contact with the outer peripheral surface of the bone part b, and the meat part can be efficiently and stably separated from the bone part b of the bone-in meat.

In the embodiment shown in FIG. 10, the metal wire 55 (the elastic member) is adopted as the scraping contact portion only in the movable clamp block 315B, but the same metal wire 55 may also be adopted in the scraping contact portion of the fixed clamp block 15A. In this case, the scraping contact portions of the fixed clamp block 15A and the movable clamp block 315B come into closer contact with the outer peripheral surface of the bone part, and the meat part can be more efficiently and stably separated from the bone part b of the bone-in meat.

Further, the meat separator 312 of the present embodiment includes the approaching device that displaces the movable clamp block 315B close to the fixed clamp block 15A, the scraping contact portion of the movable clamp block 315B is constituted by the elastic member (the metal wire 55), and, at the same time, the elastic member (the metal wire 55) also constitutes the biasing function portion that elastically pushes back the displacement in the direction of separating from the bone part b. For this reason, the structure has a small number of parts and can be made smaller and lighter, and it is also possible to bring the scraping contact portion into closer contact with the outer peripheral surface of the bone part b of the bone-in meat and to more efficiently and stably peel the meat part off the bone part b.

Furthermore, the meat separator 312 of the present embodiment adopts the metal wire 55 as the elastic member used in the scraping contact portion. For this reason, it is possible to easily obtain a high load-bearing capacity when the meat part is separated from the bone part b, and it is possible to more reliably separate the meat part from the bone part b.

Further, in the meat separator 312 of the present embodiment, the approaching device that displaces the movable clamp block 315B includes a biasing part such as a spring member that biases the movable clamp block 315B in a direction toward the fixed clamp block 15A. For this reason, the entire metal wire 55 is displaced to flexibly follow the outer surface shape of the bone part b while the metal wire 55 of the movable clamp block 315B is reliably pressed against the outer surface of the bone part b. As a result, the scraping contact portion 15At and the metal wire 55 are no longer pressed against the bone part b with an excessive force, and thus it possible to prevent damage or injury to the bone part b in advance.

The present invention is not limited to the above embodiments, and various design changes can be made without departing from the scope thereof.

For example, in the first to third embodiments described above, the concave scraping contact portion is formed by the contact blades of the pair of displaceable clamp claws, but the scraping contact portion is not limited to this configuration. For example, the scraping contact portion may be constituted by the contact blades of three or more displaceable clamp claws, and the three or more clamp claws may be biased by a spring member in a direction of approaching each other.

Further, in the fourth embodiment shown in FIG. 10, the metal wire 55 is adopted as the elastic member used in the scraping contact portion, but the elastic member is not limited to this. The elastic member may be made of a wire material other than a metal, such as a resin. For example, the elastic member can be made of a material such as an elastomer that is not harmful even if it comes into contact with food and has excellent cleanability. Further, the shape of the elastic member is not limited to a wire shape. The elastic member may have a band-like shape, for example.

Furthermore, in the fourth embodiment shown in FIG. 10, one movable clamp block 315B is disposed to face the fixed clamp block 15A, but as in the third embodiment shown in FIG. 9, the three of more clamp blocks may be disposed in an annular shape around the bone part.

Furthermore, in each of the above embodiments, the scraping contact portion (the clamp claws 23*a* and 23*b* or the metal wire 55) of the clamp block is displaceable only in a radial direction centered on the bone part, but the direction of displacement of the scraping contact portion may be a direction that intersects with the radial direction centered on the bone part.

Furthermore, in each of the above embodiments, the fixed clamp block that is fixed to the factory equipment is combined with the several movable clamp blocks that approach and separate from the fixed clamp block, but all of the clamp blocks may also be constituted by the movable clamp blocks that approach and separate from the bone part.

REFERENCE SIGNS LIST

1 Meat part separating apparatus
2 Bone-in meat
10 Clamper
11 Lifting device (moving device)
12, 112, 212, 312 Meat separator
15A, 115A Fixed clamp block (clamp block)
15B, 15C, 315B Movable clamp block (clamp block)
15At, 15Bt, 115At Scraping contact portion
16 Rotation arm
17 Air cylinder (approaching device)
20*a*, 20*b* Clamp claw
23*a*, 23*b* Clamp claw
24 Spring member (biasing function portion)
31 Bone part receiving portion
32 Contact blade
55 Metal wire (elastic member, scraping contact portion, biasing function portion)
m Meat part
b Bone part

The invention claimed is:

1. A meat separator that separates a meat part attached to a bone part by coming into contact with an outer peripheral surface of the bone part of bone-in meat that moves relatively with respect to the meat separator, the meat separator comprising:

a plurality of clamp blocks in which each of the plurality of clamp blocks include a scraping contact portion that comes into contact with the outer peripheral surface of the bone part and in which each of the scraping contact portions cooperate with each other so as to clamp the outer peripheral surface of the bone part, wherein at least one of the clamp blocks is configured so that at least a part of the scraping contact portion of the clamp block is displaceable in a plurality of directions along an outer surface shape of the bone part, and the at least one of the clamp blocks includes a biasing function portion that is configured to elastically push back the displacement in a direction moving away from the bone part.

2. The meat separator according to claim 1, further comprising:

an approaching device that is configured to relatively displace the at least one of the clamp blocks closer to other clamp blocks, wherein the at least one of the clamp blocks includes:

a pair of clamp claws that are configured to be displaceable in a direction intersecting with an approaching displacement direction in which the at least one of the clamp blocks is relatively displaced closer to the other clamp blocks, and a spring member that is configured to bias the pair of clamp claws in a direction in which the pair of clamp claws approach each other, wherein the pair of clamp claws are provided with contact blades that form a concave bone part receiving portion that receives the outer peripheral surface of the bone part between the contact blades, wherein the spring member constitutes the biasing function portion, and wherein the contact blade of each of the clamp claws constitutes the scraping contact portion.

3. The meat separator according to claim 1, further comprising:

an approaching device that is configured to relatively displace the at least one of the clamp blocks close to other clamp blocks, wherein the scraping contact portion of the at least one of the clamp blocks is constituted by an elastic member that elastically deforms so as to follow a shape of the outer peripheral surface of the bone part by coming into contact with the outer peripheral surface of the bone part, and wherein the biasing function portion is also constituted by the elastic member.

4. The meat separator according to claim 2, wherein the approaching device includes a biasing part that biases the at least one of the clamp blocks and the other clamp blocks in a direction in which the at least one of the clamp blocks and the other clamp blocks approach each other.

5. A meat part separating apparatus for bone-in meat comprising:

a bone part holding device that is configured to hold a bone part of the bone-in meat;

a meat separator that separates a meat part attached to the bone part by coming into contact with an outer peripheral surface of the bone part of bone-in meat that moves relatively with respect to the meat separator, the meat separator comprising:

a plurality of clamp blocks in which each of the plurality of clamp blocks include a scraping contact portion that comes into contact with the outer peripheral surface of the bone part and in which each of the scraping contact portions cooperate with each other so as to clamp the outer peripheral surface of the bone part, wherein at least one of the clamp blocks is configured so that at least a part of the scraping contact portion of the clamp block is displaceable in a plurality of directions along an outer surface shape of the bone part, and the at least one of the clamp blocks includes a biasing function portion that is configured to elastically push back the displacement in a direction moving away from the bone part; and a moving device that is configured to relatively move the bone part holding device and the meat separator approximately in a longitudinal direction of the bone part held by the bone part holding device.

* * * * *